May 8, 1962     B. PETREE     3,033,985
RADIATION CALORIMETER-DOSIMETER
Filed July 24, 1959     2 Sheets-Sheet 2
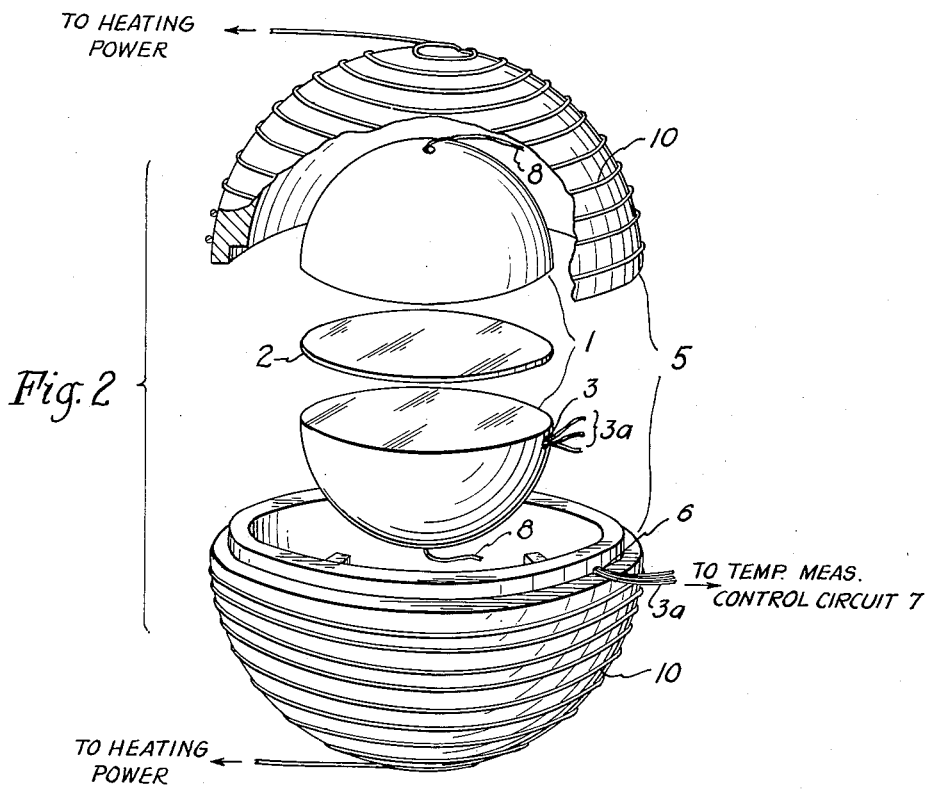
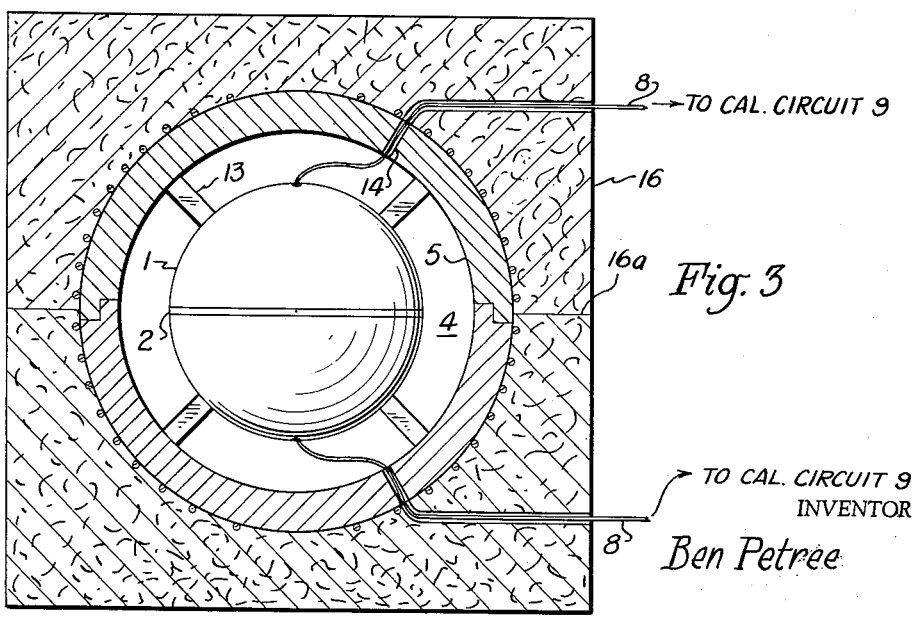
INVENTOR
Ben Petree

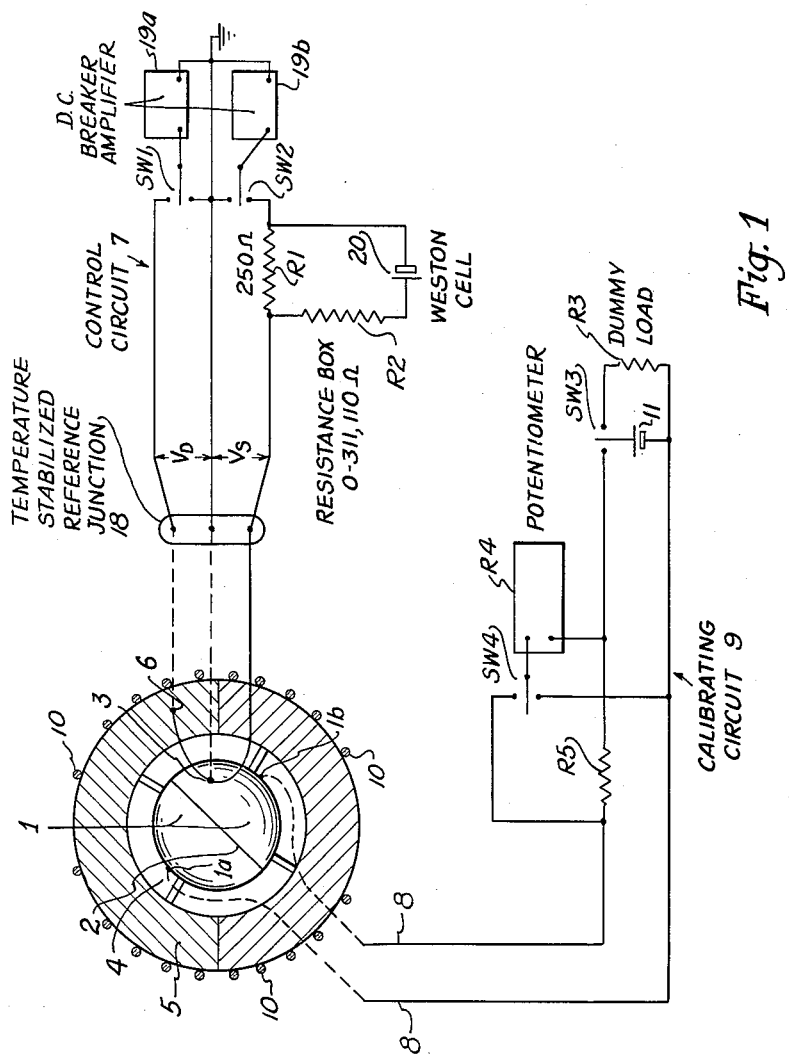

United States Patent Office 3,033,985
Patented May 8, 1962

3,033,985
RADIATION CALORIMETER-DOSIMETER
Ben Petree, Silver Spring, Md., assignor to the United States of America as represented by the Secretary of Commerce
Filed July 24, 1959, Ser. No. 829,475
9 Claims. (Cl. 250—83.3)

The present invention relates to radiation dosimeters and particularly contemplates an improved apparatus for measuring energy absorbed by material exposed to electromagnetic radiations such as X-rays and gamma rays, or to penetrating corpuscular radiations, such as electrons, protons, or neutrons, or to any combination of them.

In accordance with the principles of the present invention the amount of absorbed radiation is manifested in a calorimetric device so that an accurate measurement of the temperature rise of an absorbing body in the apparatus provides a measure of the energy absorbed by material exposed to radiation.

Previous methods such as chemical dosimetry and ionization methods are indirect and require auxiliary information to convert the measurements to radiation dosages.

While previous calorimeters have been employed for such purposes they generally have been bulky, of elaborate construction, and not capable of accuracy in measuring dosages.

In accordance with the principles of the present invention a core of graphite or other thermal and electrical conducting material is mounted within an insulated chamber formed by a shell preferably of the same material as the core, surrounding and spaced from said core. The core is held concentrically within the shell by point contact supports of insulating material to minimize heat transfer. Means are provided to sense the heat rise in the core consequent to irradiation and further means are provided to maintain the shell in thermal equilibrium with the core by heating the shell consequent to the sensing of a temperature rise in the core. Such dynamic thermal shielding effectively prevents transfer of heat to or from the core by radiation or conduction. The heat capacity of the core may be readily and accurately calibrated by measuring the temperature rise when the core is heated by means of an accurately measured electrical power. Hence, the mean temperature rise of the core when subsequently subjected to radiation serves as an accurate measurement of the energy absorbed by the core.

It is accordingly an immediate object of the present invention to provide an improved calorimetric radiation dosimeter that is simple in construction, compact, and highly accurate.

It is a further object of this invention to provide a calorimetric radiation dosimeter in which dynamic thermal shielding means are employed to prevent heat leakage from the calorimetric member.

A further object of the present invention is to provide an improved dry calorimeter having self-contained calibration means.

A still further object of the invention is to provide a calorimeter-dosimeter made of substantially homogeneous material whereby the amount of different materials employed is kept to a minimum.

Other uses and advantages of the invention will become apparent upon reference to the specification and drawings in which:

FIG. 1 is a diagrammatic representation of the improved calorimetric radiation dosimeter of the present invention showing also the circuits for providing heat balance between the inner calorimeter core and the outer shell and the circuit for calibrating the calorimeter;

FIG. 2 is an exploded view showing details of the construction of the calorimeter of this invention, and FIG. 3 is an elevation of the calorimeter of FIG. 2 shown in a mounting.

The over-all construction and operation of the calorimetric device of the present invention will first be described in connection with FIG. 1 and the detailed construction of the calorimetric mechanism will then be described in connection with FIGS. 2 and 3.

Referring to FIG. 1, there is shown a core of graphite or other thermally and electrically conductive material which may be in the form of a sphere 1 which, as will be subsequently described, is made of two hemispheres joined together at an equatorial plane by a disk or layer 2 of resistance material. The sphere may be made of graphite or other electrically and heat conductive material, such as aluminum, copper, etc., and contains a thermocouple junction designated as 3 in the drawing. The core 1 is mounted concentrically within a chamber 4 formed by a shell 5 which encases the core 1. The core 1 is mounted concentrically within the chamber 4 by a number of insulating pins made of polystyrene or other suitable insulating material, as will be described in connection with FIGS. 2 and 3. The point contact provided by such support means minimizes heat transfer between the inner core 1 and the outer shell 5. The shell 5, as will be described in connection with FIG. 2, is made in two sections to permit assembly of the instrument. The shell is made of material similar to that of the core. In addition, both sections of the shell 5 are wound with heating wire 10 so that the temperature of the shell can be controlled from an electrical power source (not shown). The heating means 10 is diagrammatically indicated in connection with FIG. 1. The entire assembly comprising the core 1 and shell 5 may be mounted in a matrix or holder to facilitate positioning in the particular radiation field to be investigated.

A second thermocouple junction 6 is provided in the shell member 5, as is shown in FIG. 1, and both the thermocouple junction 3 in the core 1 and the thermal junction 6 in the shell form part of a control circuit for maintaining the temperature of the shell in equilibrium with the core temperature. Contacts 1a and 1b are provided in the core 1 and conductors 8, 8, are connected to these contacts and are brought out through small holes in the shell 5, as will be described, to a calibrating circuit 9.

When the dosimeter comprising the core 1 is irradiated, part of the incident energy will be absorbed by the sphere and converted to heat. The resulting temperature increase will be sensed by the thermocouple junction 3 in the sphere and the resultant voltage $V_s$ which is a function of the core's temperature can be accurately measured by means provided in the control circuit 7. The control circuit 7 enables determination of the degree of unbalance between the voltages generated by the two thermocouples 3 and 6 and any unbalance can be compensated either by manual control of the power applied to the referred-to heating coil 10 on the shell 5 or by suitable automatic control means which is sensitive to the error signal represented by the difference between the voltages of the thermocouple junctions 3 and 6.

An essential feature of the present invention which contributes to the accuracy of measurement is provided by the shell 5 and the means employed for keeping the temperature thereof equal to that of the core 1 as the latter heats. This effectively prevents the transfer of heat to or from the sphere 1 either by radiation or conduction. The thermocouple junctions 3 and 6 permit even small differences between the temperatures of the sphere and shell to be readily sensed and the voltage $V_d$ generated by thermocouple junctions 3 and 6 indicates the temperature difference both in magnitude and sense. Such signal can therefore be used as a correction factor by applying current to the referred-to heating circuit 10 surrounding the shell 5 in order to reduce and eliminate temperature differences between the sphere and shell. Such corrections as above indicated can be made manually or automatically by an automatic control system responsive to the voltage signal $V_d$.

As is apparent from FIG. 1, in order that the temperature rise within the core 1 will serve as an index of radiation absorption, it is only necessary to calibrate the temperature rise of the core when electrical power is applied thereto. Specifically, the calibrating circuit 9 which is connected to the referred-to conductors 8, 8 will cause the core to heat upon the application of a measured amount of power from battery 11. The heat is generated principally in the referred-to layer of resistance material 2 which separates the two portions forming the core 1. Knowing the power necessary to produce a particular temperature rise in the core 1, the resulting temperature rise when the core is subjected to irradiation can be interpreted in terms of the equivalent electrical power necessary to produce such temperature rise. Such equivalent power therefore serves as a measure of the power absorbed by the core 1 when irradiated. With such overall summary of the construction and operation of the calorimeter in mind, the detailed construction can now be described.

FIG. 2 is an exploded view showing the construction of the calorimeter of the present invention. For convenience, the core 1 may be in the shape of a sphere comprising two hemispheres joined by the resistive layer 2 as shown in FIG. 1. The spherical core lies within the chamber provided by the two sections forming the outer shell member 5. The electrical contacts to each of the hemispheres are also shown in FIG. 2 together with the conductors 8, 8, which join the spheres to the calibration circuit 9, as shown in FIG. 1. The resistive film or layer 2 may consist of a mixture of 10 parts carbon mixed with 100 parts of epoxy and 7½ parts of a hardening agent such as boron trifluoride piperidene.

The resistance of the core 1 when made of a material such as graphite is approximately 1 ohm when no resistive film or layer 2 is employed. The resistances of the electrical conductors 8, 8 are negligible compared to the resistance of the core 1 so that the current will generate heat in the core and not in the conductors. The resistivity of the film 2 is made so that the assembled core 1 will have a resistivity of approximately 500 ohms.

FIG. 2 clearly shows the heating coils 10 wrapped around the outer periphery of the shell sections. The heating coils 10 are made of Nichrome or suitable electrical resistance wire. A sufficient number of turns are wound on the shell to provide the necessary degree of heating. The shell is preferably made of the same material as the core 1. While the core 1 has been described as being made of carbon or graphite, a number of other materials can be used to provide dose measurements, provided the material selected is a reasonably good conductor of heat and electricity.

The spherical shape illustrated in FIG. 2 is convenient, but it will be readily apparent that other and more complicated constructions can be used. For example, the sphere can be divided in three segments by two parallel planes instead of the equatorial plane shown and joined with two layers of resistive material so as to better distribute the electrical heating used for calibration purposes.

FIG. 3 is a sectional view of the calorimeter placed within a convenient holder 16 which may be made of styrofoam. The holder is suitably sectioned as indicated at 16a. FIG. 3 clearly shows the outer shell 5, the chamber 4, and the inner concentric core 1.

The sphere 1 is conveniently supported concentrically within shell 5 by studs 13 made of polystyrene or other suitable electrical and heat insulating material. As shown in FIG. 3, the conductors 8 forming the connection for the calibrating circuit are conveniently brought out through small holes 14 provided in shell 5. The leads for the thermocouple junction 3 identified in connection with FIG. 1 are connected by leads 3a (FIG. 2) which are threaded through a small hole 6 provided in the shell 5 as shown in FIG. 2.

Temperature-Sensing Circuit

The temperature-sensing or control circuit 7 briefly referred to in connection with FIG. 1 functions to provide information for keeping the temperature of the shell 5 in equilibrium with that of calorimeter core 1.

The control circuit, as detailed in FIG. 1, includes the referred-to core 1, and shell temperature-sensing thermocouple junctions 3 and 6 connected as shown to a reference junction 18. The reference junction 18 provides a stabilized reference temperature which is readily obtained by immersing the junction in ice. Alternately any stable reference temperature can be maintained by using conventional phase state change techniques such as, for example, where a crystalline substance is kept in equilibrium with a liquid.

The temperature reference junction 18 is in turn connected to contacts of switches SW1 and SW2. The contactors of each of these switches are connected to respective D.C. breaker amplifiers 19a, 19b. The breaker amplifiers employed may be of the type made by the Beckman Instrument Company and identified as a D.C. breaker amplifier Model 14.

The control circuit includes a resistor R1 and a resistance box R2 connected to an accurate voltage source such as is represented by Weston cell 20 in FIG. 1.

If the temperature of the core is equal to the temperature of the shell the voltage $V_d$ in FIG. 1 will equal 0. When the temperature of the core differs from the temperature of shell 5 then the amplitude of $V_d$ will be either greater or less than 0, the polarity thereof being determined by whether the temperature of the core is greater or less than that of the shell.

The output of D.C. breaker amplifier 19a indicates to a high degree of accuracy the magnitude of the voltage $V_d$ which is the difference between the temperatures of core 1 and shell 5. By adjusting the electric power to the heater coils 10 the temperature of shell 5 can then readily be changed until the output of amplifier 19a is 0. This condition of adjustment prevents heat transfer to the core from the surroundings by conduction and radiation, and is maintained during the calibrating and measurement operations.

By observing the output of amplifier 19b the resistance box R2 can be adjusted until the current through resistor R1 produces a voltage that is equal and opposite to the voltage $V_s$. The output of amplifier 19b will be 0 under such condition of balance and an accurate measure of the value of $V_s$ is thereby obtained.

Calibrating Circuit (FIG. 1)

As previously mentioned, the calorimeter may be conveniently and accurately calibrated by applying power from source 11 to the core 1 through connecting leads 8, 8. The source represented by battery 11 may be selectively connected to the core 1 or to dummy load 3 by a 2-position switch SW3. For some time prior to the calibration, SW3 is thrown to the right so as to connect the dummy load and thereby permit the voltage of the source 11 to become stable.

An adjustable potentiometer designated as R4 in FIG. 1 may be selectively connected to measure either the source voltage 11 or the voltage across resistor R5 which corresponds to the current passing through the calorimeter core 1.

Specifically, when switch SW3 is thrown to the left as viewed in FIG. 1, so as to connect the source 11 across the core 1 in series with resistor R5, and switch SW4 is thrown to the down position, potentiometer R4, when adjusted to balance, will provide a measurement of the voltage of battery source 11. When switch SW4 is then thrown to the up position potentiometer R4, when balanced, will provide a measurement corresponding to the current flow in resistor R5, and hence in the core 1. From these two measurements the power input to the core 1 can be accurately calculated.

It will be apparent that the embodiments shown are only exemplary and that various modifications can be made in construction and arrangement within the scope of invention as defined in the appended claims.

What is claimed is:

1. A calorimetric radiation dosimeter for measuring the energy absorbed by a body exposed to penetrating high energy irradiation comprising a core of electrically and thermally conducting material, a thermal shield made of the same material as the core enclosing said core in spaced relation thereto, means for sensing the temperature change in said core when subjected to said irradiation, and means for adjusting the temperature of said shield into equilibrium with the temperature of said core.

2. The invention of claim 1 including means for senssing the temperature of said shield.

3. The invention of claim 2 in which said temperature sensing means comprises thermocouple junction means embedded in said core and shield respectively.

4. The invention of claim 3 in which the means for adjusting the temperature of said shield comprises electrical heater means attached to said shield and means for applying electrical power to said heating means.

5. The invention of claim 4 including means for calibrating the heat capacity of said core comprising a source of electrical power, calibrating circuit means including means for selectively connecting said power source to said core and means for measuring the amount of power applied to said core to produce a particular temperature rise therein.

6. The invention of claim 5 in which said core comprises a plurality of symmetrical geometric masses each having a planar surface, a film of electrical resistive material corresponding in size to said surfaces, said masses and film being joined into an integral mass so that the resistivity of said core corresponds to that of said film.

7. The invention of claim 6 in which said calibrating circuit means is connected to each of said geometric masses respectively.

8. The invention of claim 6 including a temperature measuring circuit, means connecting said circuit to said temperature sensing thermocouples, said measuring circuit including a temperature stabilized reference junction, a source of voltage, means for balancing said source voltage against the thermocouple voltage.

9. The invention of claim 6 in which said masses are made of graphite and said film consists essentially of carbon particles mixed with epoxy resin in a proportion sufficient to produce a selected resistivity.

References Cited in the file of this patent

UNITED STATES PATENTS

| | | |
|---|---|---|
| 2,579,994 | Zinn | Dec. 25, 1951 |
| 2,800,023 | Obermaier | July 23, 1957 |
| 2,811,856 | Harrison | Nov. 5, 1957 |
| 2,837,917 | Machler | June 10, 1958 |